United States Patent [19]

Davies

[11] Patent Number: 5,806,919
[45] Date of Patent: Sep. 15, 1998

[54] LOW DENSITY-HIGH DENSITY INSERT REINFORCED STRUCTURAL JOINTS

[75] Inventor: Kevin Leo Davies, Clarkston, Mich.

[73] Assignee: General Motors Corporation, Detroit, Mich.

[21] Appl. No.: 743,514

[22] Filed: Nov. 4, 1996

[51] Int. Cl.$^6$ .................................................. B62D 21/02
[52] U.S. Cl. .................... 296/205; 296/187; 296/203.01; 52/309.4
[58] Field of Search ......................... 296/203.01, 203.02, 296/203.03, 203.04, 205, 187; 277/603, 617, 936; 293/109, 120; 52/309.4, 309.7

[56] References Cited

U.S. PATENT DOCUMENTS

| | | | |
|---|---|---|---|
| 3,637,252 | 1/1972 | Metsker | 296/31 P |
| 3,968,561 | 7/1976 | Oakes et al. | 29/460 |
| 4,031,677 | 6/1977 | Tantlinger | 52/262 |
| 4,340,226 | 7/1982 | Haines | 273/73 F |
| 4,453,763 | 6/1984 | Richards | 296/185 |
| 5,076,632 | 12/1991 | Surratt | 296/96.21 |
| 5,085,151 | 2/1992 | Wako et al. | 105/206.1 |
| 5,096,243 | 3/1992 | Gembinski | 293/120 |
| 5,102,188 | 4/1992 | Yamane | 296/205 |
| 5,213,391 | 5/1993 | Takagi | 296/205 |
| 5,322,181 | 6/1994 | Nelson | 220/461 |
| 5,382,375 | 1/1995 | Morgan et al. | 293/109 |
| 5,388,885 | 2/1995 | Warren | 296/203 |
| 5,411,308 | 5/1995 | Kreis et al. | 296/30 |

FOREIGN PATENT DOCUMENTS

| | | | |
|---|---|---|---|
| 405319305 | 12/1993 | Japan | 296/205 |

*Primary Examiner*—D. Glenn Dayoan
*Assistant Examiner*—Jason Morrow
*Attorney, Agent, or Firm*—Cary W. Brooks

[57] ABSTRACT

The present invention includes the use of a low density composite or foam core to support a high density rigid composite or foam layer or shell within a structural joint. The high density rigid layer or shell is located in areas immediately adjacent the joint welds while a substantial portion of the void in the joint is filled with a low density composite or foam core. A high density layer precursor may be molded onto the outside of a lightweight low density core. The reinforcement insert is dropped into the space between body panels before the panels are welded together to form a structural joint. The body panels with insert may thereafter be subjected to high temperature processes greater than 300° F. causing the high density layer precursor to cure, further rigidify, and adhere the high density layer to the metal body panels to substantially stiffen the joint. The low density foam supports the high density layer precursor during the curing process.

6 Claims, 1 Drawing Sheet

U.S. Patent        Sep. 15, 1998        5,806,919
FIG. 1
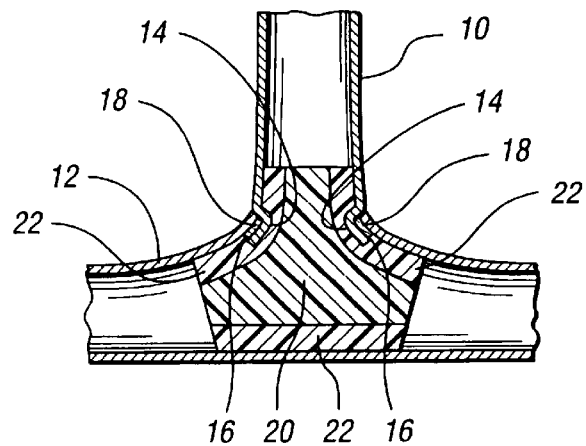
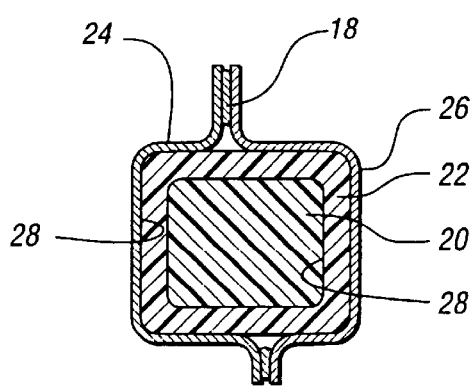
FIG. 2
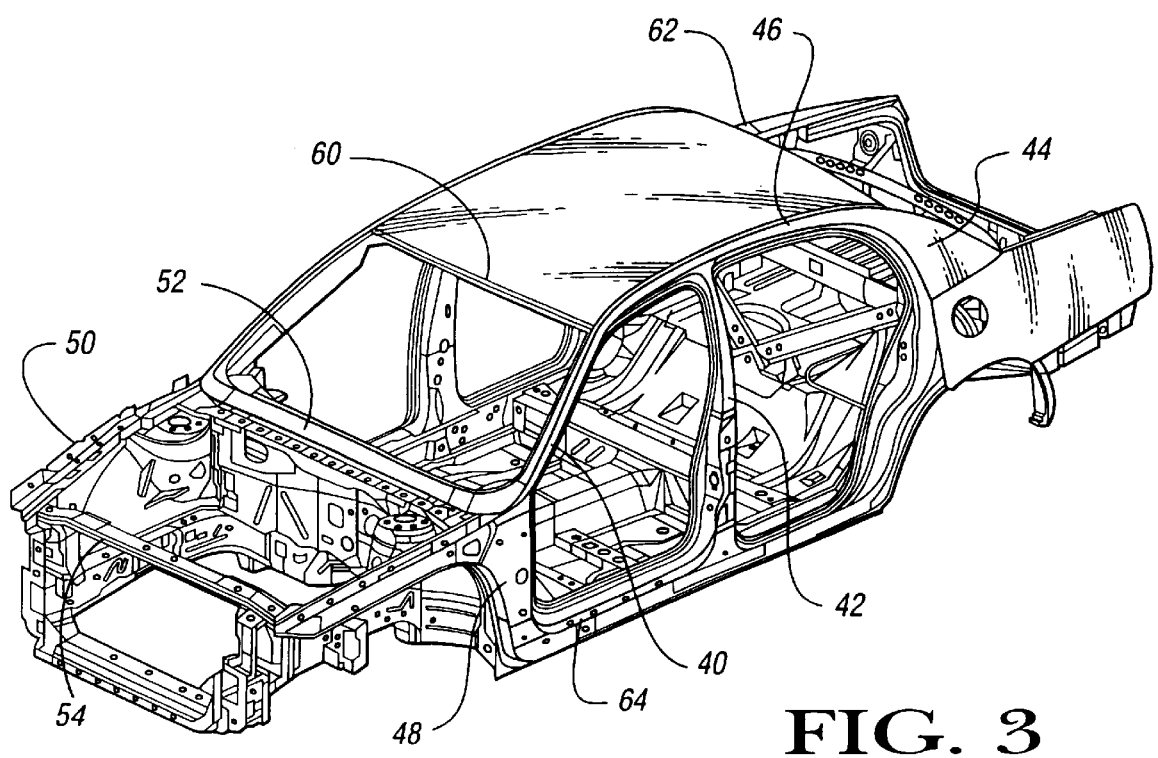
FIG. 3

LOW DENSITY-HIGH DENSITY INSERT REINFORCED STRUCTURAL JOINTS

TECHNICAL FIELD

This invention relates to reinforced structural joints.

BACKGROUND OF THE INVENTION

In many applications it is desirable to reinforce structural joints to improve their strength and resonance vibration properties. Heretofore, others have used rigid foams to reinforce steel stampings that are welded together to form a structural joint. However, since such rigid foams are relatively dense and those skilled in the art have struggled with low weight ways to improve structural properties of joints using rigid foams. Some have attempted to place rigid foam layers only in the areas adjacent the joint weld but have had difficulties getting the rigid foam to stay in position and adhere to the metal during post high temperature processing such as automotive paint baking.

The present invention provides advantages and alternatives over the prior art.

SUMMARY OF THE INVENTION

The present invention includes the use of a low density composite or foam core to support a high density rigid composite or foam layer or shell within a structural joint. The high density rigid layer or shell is located in areas immediately adjacent the joint welds while a substantial portion of the void in the joint is filled with a low density composite or foam core. A high density layer precursor may be molded onto the outside of a lightweight low density core. The reinforcement insert is dropped into the space between body panels before the panels are welded together to form a structural joint. The body panels with insert may thereafter be subjected to high temperature processes greater than 300° F. causing the high density layer precursor to cure, further rigidify, and adhere the high density layer to the metal body panels to substantially stiffen the joint. The low density foam supports the high density layer precursor during the curing process.

These and other objects, features and advantages of the present invention will become apparent from the following brief description of the drawings, detailed description and appended claims and drawings.

BRIEF DESCRIPTION OF THE DRAWINGS

FIGS. 1 and 2 illustrate structural joints utilizing a low density/high density composite or foam reinforcement insert according to the present invention; and FIG. 3 illustrates a variety of structural voids/joints in which the current invention may be utilized on an automobile vehicle body.

DETAILED DESCRIPTION

FIG. 1 is a sectional view illustrating a first structural beam meeting with and welded to a second structural beam 12 in a T-shaped configuration. The first structural beam includes a first end having a lip 14 extending into an inside wall 16 of the second structural beam 12 at an opening therein and a weld 18 provided between the lip 14 and the inside wall 16 of the second structural beam 12. A low density/high density reinforcement insert is provided in the void of the structural joint formed by the first and second structural beams 10, 12. The low density/high density reinforcement insert is put inside the second structural beam 12 before the first structural beam 10 is inserted into the second structural beam and the beams welded together. The low density/high density reinforcement insert includes a low density core 20 made from a composite or foam having a density of 5 lbs/ft$^3$ or less. A high density layer or shell 22 overlays at least portions of the outer surface of the low density core 20. Preferably a high density precursor 22 is molded to the core 20 prior to subsequent curing of the precursor to form a cured, rigid, high density layer 22. The high density layer 22 is positioned at least in areas immediately adjacent the structural joint welds 18.

As shown in FIG. 2, two stamped sheet metal members 24, 26 are welded together to form a structural component having a joint weld 18. The structural component shown in FIG. 2 has a closed cross section. The high density reinforcement layer 22 is positioned along the entire inside surface 28 of the closed structural joint including areas immediately adjacent the joint weld 18. A lower density core 20 is provided to maintain the high density layer 22 precursor in position during subsequent curing.

Preferably the cured, rigid, high density reinforcement layer 22 has a thickness suitable to reinforce the structural joint while maintaining a low mass, but preferably ranges from 0.25 to 1 inch in thickness. Preferably the cured, rigid, high density reinforcement layer 22 has a density ranging from about 20–40 lbs/ft$^3$ and has a compression modulus of about 80,000 to 100,000 psi. The low density core 20 has a density of 5 lbs/ft$^3$ or less and a greater than 30 psi compressive strength. Both the high density layer 22 and the low density core 20 preferably are capable of withstanding temperatures in the range of 300°–350° F. so that they may endure high temperature processes such as that experienced in automotive paint bake ovens.

Once the low density/high density reinforcement insert is positioned in the structural joint and the joint welded together, the insert is subjected to a high temperature sufficient to cure the high density foam precursor and adhere layer 22 to the metal members forming the structural joint. A suitable material for the high density layer precursor may be an epoxy based foam such as NOVACORE™ available from Novamax Technologies, Livonia, Mich. This is a one part thermoset preformed epoxy foam. A suitable low density core material may be a phenolic foam such as PHEN-O-CELL™ available from ARC Resins Corporation.

The low density/high density composite reinforcement insert according to this invention may be utilized in structural joints of vehicles and stationary structures. FIG. 3 illustrates a variety of locations in a vehicle where a low density/high density reinforced structural joint may be utilized according to the present invention. The insert may be located in the structural joint of a vehicle such as the joints where either of the A, B, or C pillars 40, 42, 44 respectively, meet the side roof rail 46 or the floor rocker beam 64; where the hinge pillar 48 meets the A pillar 40; where the side roof rail 46 meets the front header 60 or rear header 62; where the hinge pillar 48 meets the longitudinal rails 50 of the engine cradle; where the longitudinal rails 50 of the engine cradle meet the instrument panel beam 52; or where the longitudinal rails 50 meet the front tie bars 54 of the engine cradle. The weight of structural joints may be reduced using the low density/high density reinforced insert according to the present invention and increase the strength and stiffness of the joint.

I claim:

1. A reinforced structural joint comprising:
   first and second metal members welded together to form a structural joint and defining a void in the area adjacent the weld;

an insert located in the void having a low density composite core having a density less than 5 lbs/ft$^3$, a high density layer positioned on an outer surface of the core, said high density layer having a density greater than 20 lbs/ft$^3$, said high density layer adhere to the metal members in an area adjacent the weld.

2. A reinforced structural joint as set forth in claim 1 wherein said metal members are constructed and arranged to form a structural joint having a closed cross sectional area and said high density layer is adhere to the inside surface of the metal members defining the closed cross sectional area.

3. A reinforced structural joint as set forth in claim 1 wherein the high density layer has a density ranging from 20 lbs/ft$^3$ to 40 lbs/ft$^3$.

4. A reinforced structural joint as set forth in claim 1 wherein the high density layer comprises an epoxy foam.

5. A reinforced structural joint as set forth in claim 1 wherein the low density core comprises a phenolic foam.

6. A reinforced structural joint as set forth in claim 1 wherein the high density layer is molded onto the low density core.

* * * * *